US010354446B2

(12) United States Patent
Jagnow et al.

(10) Patent No.: US 10,354,446 B2
(45) Date of Patent: Jul. 16, 2019

(54) METHODS AND APPARATUS TO NAVIGATE WITHIN VIRTUAL-REALITY ENVIRONMENTS

(71) Applicant: Google Inc., Mountain View, CA (US)

(72) Inventors: Robert Carl Jagnow, Mountain View, CA (US); Robbie Tilton, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 32 days.

(21) Appl. No.: 15/097,920

(22) Filed: Apr. 13, 2016

(65) Prior Publication Data

US 2017/0301135 A1    Oct. 19, 2017

(51) Int. Cl.
| | | |
|---|---|---|
| *G06T 19/00* | (2011.01) | |
| *G02B 27/01* | (2006.01) | |
| *G06F 3/01* | (2006.01) | |
| *G06T 19/20* | (2011.01) | |
| *G06F 3/0481* | (2013.01) | |
| *G06F 3/0484* | (2013.01) | |

(52) U.S. Cl.
CPC .......... *G06T 19/003* (2013.01); *G02B 27/017* (2013.01); *G06F 3/011* (2013.01); *G06F 3/017* (2013.01); *G06F 3/0484* (2013.01); *G06F 3/04815* (2013.01); *G06T 19/006* (2013.01); *G06T 19/20* (2013.01)

(58) Field of Classification Search
None
See application file for complete search history.

(56) References Cited

U.S. PATENT DOCUMENTS

| | | | |
|---|---|---|---|
| 7,646,394 B1 | 1/2010 | Neely, III et al. | |
| 7,893,935 B1 * | 2/2011 | Neely, III | ............... G06F 3/011 |
| | | | 345/419 |
| 2010/0093435 A1 | 4/2010 | Glaser et al. | |
| 2011/0119640 A1 | 5/2011 | Berkes et al. | |
| 2012/0192088 A1 | 7/2012 | Sauriol et al. | |
| 2012/0326966 A1 | 12/2012 | Rauber | |
| 2013/0271371 A1 | 10/2013 | Tsou et al. | |
| 2015/0193979 A1 * | 7/2015 | Grek | ..................... G06F 1/1694 |
| | | | 345/633 |

(Continued)

FOREIGN PATENT DOCUMENTS

WO    2017/180206 A1    10/2017

OTHER PUBLICATIONS

Bowman et al.; An Evaluation of Techniques for Grabbing and Manipulating Remote Objects in Immersive Virtual Environments; Proceedings of the 1997 Symposium on Interactive 3D Graphics, Apr. 27-30, 1997; pp. 35-38.

(Continued)

*Primary Examiner* — Yi Wang
(74) *Attorney, Agent, or Firm* — Brake Hughes Bellermann LLP

(57) ABSTRACT

Example methods and apparatus to navigate within virtual-reality (VR) environments are disclosed. A disclosed example method includes defining a reachable portion of a VR environment, defining an unreachable portion of the VR environment separate from the reachable portion, and translating a physical hand location in the reachable portion into a virtual hand location in the unreachable portion.

20 Claims, 5 Drawing Sheets

(56) References Cited

U.S. PATENT DOCUMENTS

2016/0098094 A1    4/2016  Minkkinen
2017/0031503 A1*   2/2017  Rosenberg .............. G06F 3/017

OTHER PUBLICATIONS

Nhung Nguyen et al.; From Body Space to Interaction Space—Modeling Spatial Cooperation for Virtual Humans; The 10th International Conference on Autonomous Agents and Multiagent Systems—vol. 3, May 2-6, 2011; pp. 1047-1054.

Poupyrev et al.; The Go-Go Interaction Technique: Non-linear Mapping for Direct Manipulation in VR; ACM Symposium on User Interface Software and Technology, Nov. 2-8, 1996; pp. 79-80.

International Search Report and the Written Opinion for PCT Patent Application No. PCT/US2016/068542, dated Mar. 30, 2017, 11 pages.

International Preliminary Report on Patentability for PCT Application No. PCT/US2016/068542, dated Jul. 2, 2018, 17 pages.

* cited by examiner

METHODS AND APPARATUS TO NAVIGATE WITHIN VIRTUAL-REALITY ENVIRONMENTS

FIELD OF THE DISCLOSURE

This disclosure relates generally to virtual reality (VR), and, more particularly, to methods and apparatus to navigate within VR environments.

BACKGROUND

Virtual-reality (VR) environments use sensors, cameras, etc. to detect where a person is located and how the person moves within a VR environment. The location and movement information can be used to determine when a person reaches and/or interacts with an object in the VR environment.

SUMMARY

Methods and apparatus to navigate within VR environments are disclosed. A disclosed example method includes defining a reachable portion of a virtual-reality (VR) environment, defining an unreachable portion of the VR environment separate from the reachable portion, and translating a physical hand location in the reachable portion into a virtual hand location in the unreachable portion.

A disclosed examples apparatus includes a reachable sensor to sense a physical hand location, and a processor programmed to: define a reachable portion of a virtual-reality (VR) environment, define an unreachable portion of the VR environment beyond the reachable portion, and translate the sensed physical hand location in the reachable portion into a virtual hand location in the unreachable portion.

A disclosed example non-transitory machine-readable media stores machine-readable instructions that, when executed, cause a machine to at least define a reachable portion of a virtual-reality (VR) environment, define an unreachable portion of the VR environment, and translate a physical hand location in the reachable portion into a virtual hand location in the unreachable portion.

DETAILED DESCRIPTION

Figure 1:
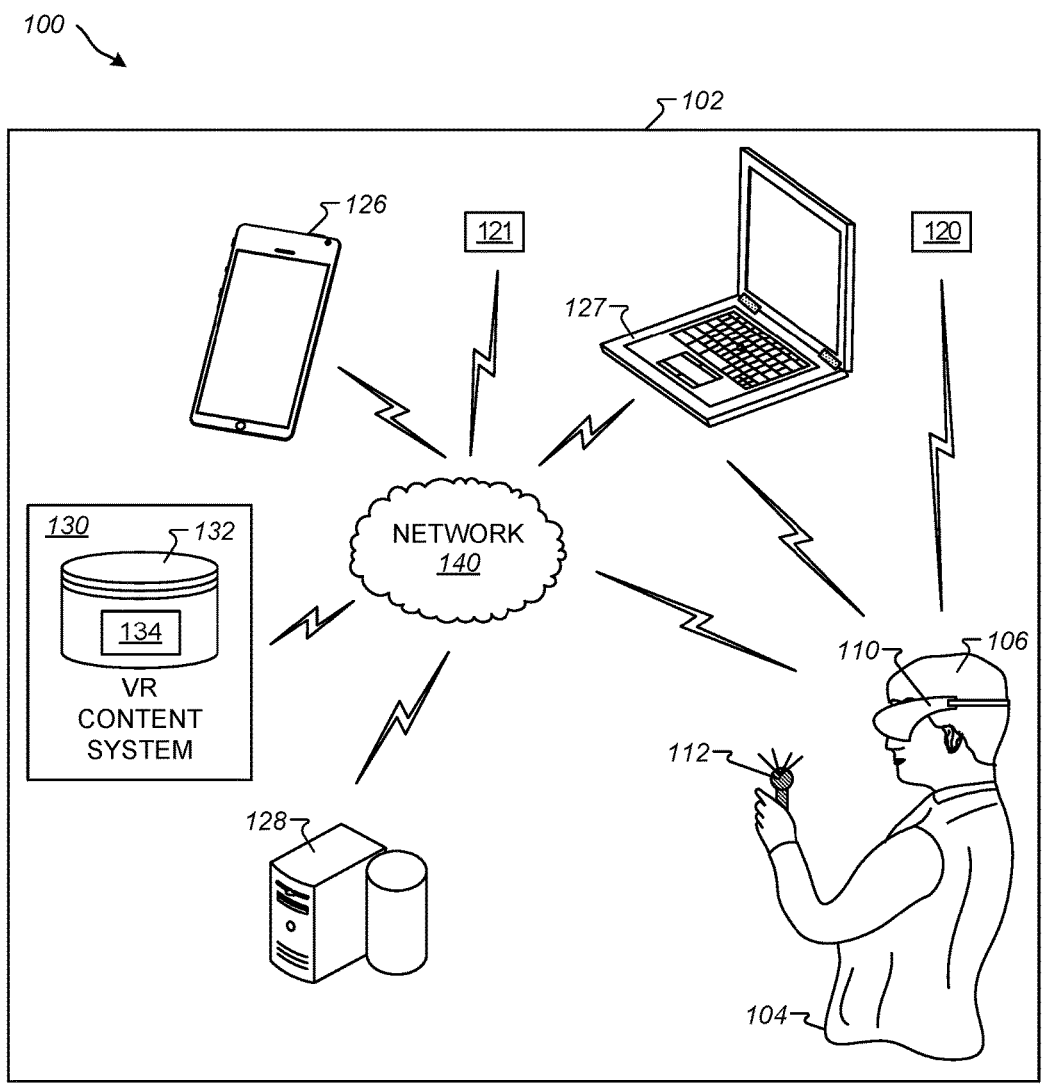
FIG. 1 is a schematic illustration of an example VR environment in accordance with the teachings of this disclosure.

VR content creators prefer not to have to put all objects within arm's reach of a user. Users prefer not to have to walk to every object in a VR environment for it to be within arms reach. Methods and apparatus that overcome at least these problems are disclosed herein.

Disclosed example methods and apparatus map or translate movements and locations between a reachable portion (e.g., space) of a VR environment that is, e.g., within reach (e.g., of an arm, a wand, a controller, a pointer, a worn object etc.), into an unreachable portion (e.g., space) of the VR environments that falls outside the reachable portion. This mapping or translation can be applied regardless of where a user is dynamically situated or located in a VR environment, and can change as the user moves within the VR environment. The unreachable portion, which generally has intractable or virtual objects, can be very large or very small. The mapping or translation (e.g., transformation) accounts for what is outside reach by, among other things, providing them an ability to interact with virtual objects outside their reach using physical movements within their reach, thus, providing an enhanced VR experience for the user and a content creator. In this way, a user can naturally navigate substantially, most, generally, etc. all of a VR environment, while only needing to make physical movements within their reach. Either of the reachable portion and the unreachable portion can be larger than the other. Moreover, the reachable portion and the unreachable portion need not have the same scale. For example, a user might see tiny hands in front of them arranging dollhouse furniture or performing microsurgery with great precision.

Using the volumetric coordinates of the unreachable portion, and the reach of a particular user, the methods and apparatus disclosed herein translate the user's physical movements and/or locations within the reachable portion into movements and/or locations within the unreachable portion. The reachable portion can be determined with respect to a dynamic reference point, such as the user' body or head location in the VR environment. Arm's reach can be determined taking into account handedness, comfort, context, medical constraints, user preferences, etc. The reachable and unreachable portions need not have the same shape, and may change over time, and the mapping or translation may be different in different directions and times.

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s). These examples and variants and portions thereof shown in the attached drawings are not drawn to scale, with specific shapes, or with specific relative dimensions as they are not important to this disclosure and may render the drawings more difficult to comprehend. Specific elements may have been intentionally exaggerated for discussion purposes. Instead, the drawings have been drawn for clarity and comprehension. Further, the arrangement of elements and couplings may be changed, rearranged, etc. according to other implementations of this disclosure and the claims herein.

Turning to FIG. 1, a block diagram of an example VR system 100 is shown. The example VR system 100 includes a VR environment (e.g., space) 102. While shown for simplicity as a square in FIG. 1, the VR environment 102 may have any shape(s) and dimension(s), and need not have a geometric shape. However, a non-geometric shape may be approximated by a geometric shape for simplicity. In the example of FIG. 1, a user 104 can wear a VR head-mounted display (HMD) 110, and can hold a VR controller 112.

The HMD 110 can be used to, among other things, determine the location of the head 106 of the person 104 by determining, as a proxy, the location of the HMD 110. Example methods that can be used to determine the location of the head 106 include emitters or images (one of which is designated at reference numeral 120) that can be sensed by the HMD 110, and/or sensors or cameras (one of which is designated at reference numeral 121) that can sense the location of the HMD 110. The HMD 110 can include one or more cameras to sense the emitter/images 120. Any number and/or type(s) of emitters 120 and sensors/cameras 121, and any method of using the same to determine location of the HMD 110 may be used. Determination of location may be performed by the HMD 110 or another device 126, 127, 128, 130. The HMD 110, or the other devices 126-128 and 130 may be implemented by the example computing devices P00 and P50 of FIG. 4.

The controller 112 can be used to, among other things, determine the location of a hand 108 of the person, a held object, a worn object, etc. by determining, as a proxy, the location of the controller 112. Example methods that can be used to determine the location of the controller 112 are the sensors/cameras 121 and the HMD 110 sensing the controller 112. Any number and/or type(s) of sensors/cameras 121, and any method of using the same to determine location of the controller 112 may be used. The controller 112 can emit and/or reflect infrared (IR) light to aid in tracking hand location by IR sensors of the HMD 110, or the sensors/cameras 121. Additionally or alternatively electromagnetic signals and sensors can be used to tracking. Determination of location may be performed by the HMD 110 or another device 126-128, 130.

As shown in FIG. 1, the example VR system 100 includes a plurality of computing and/or electronic devices that can exchange data over a network 140. The devices may represent clients or servers, and can communicate via the network 140 or any other additional and/or alternative network(s). Example client devices include, but are not limited to, a mobile device 126 (e.g., a smartphone, a personal digital assistant, a portable media player, etc.), an electronic tablet, a laptop or netbook 127, a camera, the HMD 110, a desktop computer 128, a gaming device, and any other electronic or computing devices that can communicate using the network 140 or other network(s) with other computing or electronic devices or systems, or that may be used to access VR content or operate within a VR environment. The devices 110 and 126-128 may represent client devices. In some examples, the devices 110 and 126-128 include one or more processors and one or more memory devices, which can execute a client operating system and one or more client applications that can access, control, and light-emitting portion VR content on a light-emitting portion device implemented together with each respective device. One or more of the devices 110, 126-128 and 130 can, e.g., emit or reflect infrared (IR) or other type(s) of light that can be detected by one or more cameras to help determine location of a user or the devices 110, 126-128, 130 for tracking or other VR functions. Additionally or alternatively electromagnetic signals and sensors can be used to tracking.

Figure 2A:
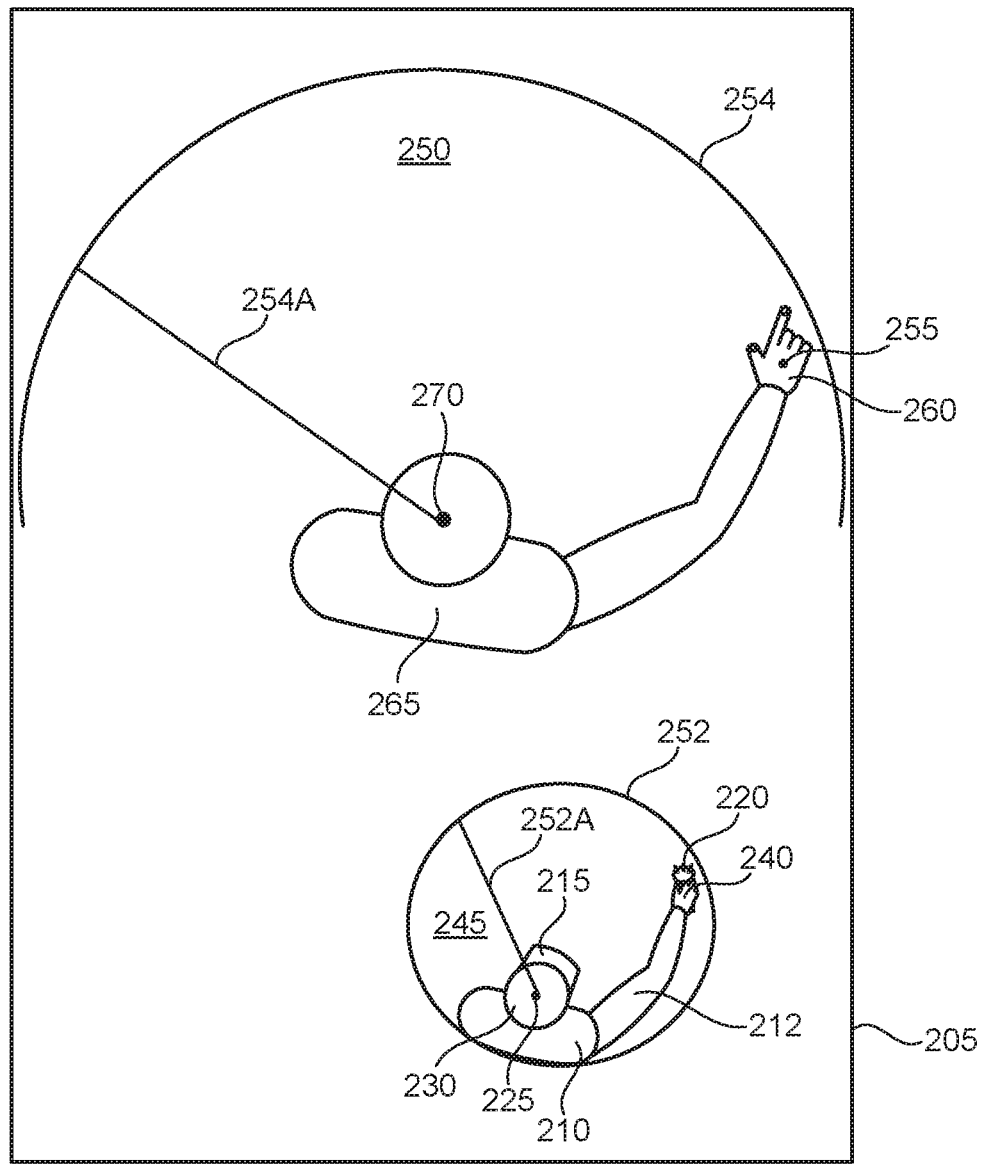
FIGS. 2A and 2B are, respectively, top and side views of an example navigation within a VR environment.
Figure 2B:
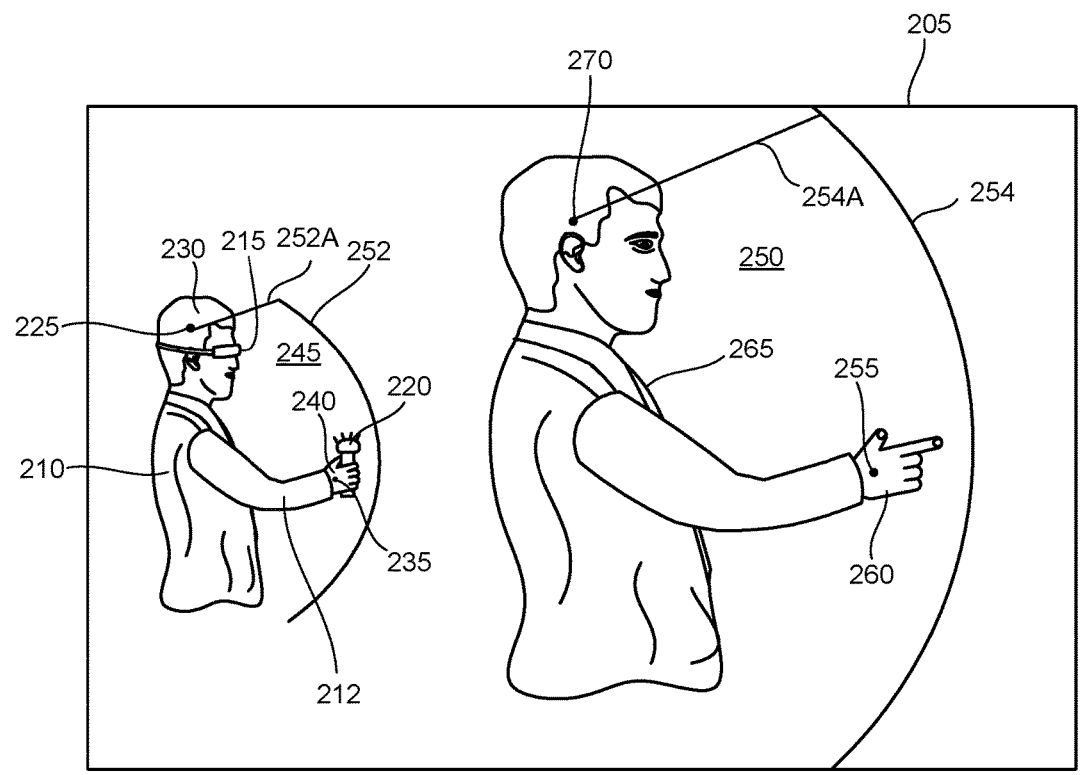

FIGS. 2A and 2B illustrate an example operation of the example methods and apparatus disclosed herein, which may be implemented or operated in the example environment 100 of FIG. 1. FIG. 2A is a top view of an example three-dimensional (3D) VR environment 205 (e.g., the example environment 100 of FIG. 1, and FIG. 2B is a side view of the example 3D VR environment 205. While shown for simplicity as a rectangle in FIGS. 2A and 2B, the VR environment 205 may have any shape(s) and dimension(s), such as geometric shapes (e.g., spheres, ovals, hemispheres, disproportionate ovals/spheres, hexagons, octagons, etc.), non-geometric shapes, non-geometric shapes approximated by a geometric shape for simplicity, or combinations thereof.

In the example of FIGS. 2A and 2B, a user 210 wears an HMD 215 (e.g., the example HMD 110 of FIG. 1), and holds a VR controller 220 (e.g., the example controller 112 of FIG. 1). The physical location 225 of the user's head 230 (that is, a physical head location 225), and the location(s) 235 of the user's hand(s) 240 can be determined using and/or by the HMD 215 and/or the VR controller 220. As shown in FIGS. 2A and 2B, a virtual user 265 likewise has a virtual head location 270. Other devices (e.g., any of the devices 126-128 and 130) and/or methods may additionally or alternatively be used to determine the locations 225 and 235 of the user's head 230 and hand(s) 240, respectively. The HMD 215 and the controller 220 may be communicatively coupled to other devices such as the example device 126-128 and 130 that determine locations and/or to perform the example methods disclosed herein. The HMD 215, the controller 220 and the devices 126-128 and 130 may be implemented by the example computing devices P00 and P50 of FIG. 4.

A reachable portion 245 can be defined by the location 225 of the user's head 230, and a region about the location 225 circumscribed by the hand 240 or controller 220 as one or more arms 212 of the user 210 moves (e.g., rotate(s)) horizontally and/or vertically about the location 225. In the illustrated example of FIGS. 2A and 2B, range of motion is a simple 3D arc or sphere. However, other shapes may be used or defined, including shapes that differ in different directions. For example, if a user is right-handed, is somehow limited in motion on the left side, prefers to use the right side, etc., the reachable portion 245 may be larger on the right than on the left, or the one side may be omitted.

Given the volumetric 3D coordinates of the VR environment 205 and the characteristic(s) of the reachable portion 245, a mapping or translation of location and/or movement of the user 210 in the reachable portion 245 into a virtual location and/or virtual movement of a virtual user or avatar 265 in an unreachable portion 250 can be defined. The reachable portion 245 and the unreachable portion 250 are delineated by a boundary 252 (e.g., line), and the unreachable portion is delineated by a boundary 254 (e.g., line). In the example of FIGS. 2A and 2B, the boundary 254 is a sphere that has a radial distance of 254A from the location 270 to the boundary 254, and the boundary 252 is a sphere that has a radial distance 252A from the location 225 to the boundary 252.

In some examples or instances, the reachable portion 245 and the unreachable 250 may not both extend to the boundary 252. They may have different shapes and abut the boundary 252 at the same time. The unreachable portion 250 need not encompass the entire VR environment 205, as shown in FIGS. 2A and 2B, where a simple 3D arc or circle is used for simplicity of implementation. Other shapes may be used. For example, the unreachable portion 250 may be expanded beyond the VR environment 205 to provide more complete coverage of the VR environment 205, more complex shapes for more complexly shaped VR environments may be used, etc. Again, the unreachable portion 250 does not have to be the same size or shape in different directions, that is, the distances from the location 225 to the boundary 252 may be different in different directions. For example, the boundary 252 may be a first distance from the location 225 in a first direction, and a second distance in a second direction.

In some examples, the mapping or translation is defined to allow the user 210 to access substantially or generally all of the VR environment 205 and/or the unreachable portion 250 with movement within the reachable portion 245. In other examples, the mapping or translation is defined to enable access to only a part of the VR environment 205 and/or the unreachable portion 250 using movements within the reachable portion 245.

In the case of a simple 3D arc or sphere shape, a simple translation or mapping scaling between the size of the reachable portion 245 and the unreachable portion 250, factoring in the locations of centers of the reachable portion 245 and the unreachable portion 250 can be used.

The center of the virtual user (e.g., avatar) 265 can be dynamically or statically controlled by the user 210 using, for example, the controller 220, can be statically or dynamically defined by a VR content creator, etc. They need not overlap, as shown in FIGS. 2A and 2B. In some examples, the center of the virtual user 265 coincides with the physical location 225 of the user 210. That is, the center 270 and 225 are coinciding.

Movement or locations in the reachable portion 245 can be mapped to movement and locations in the unreachable portion 250 by applying a scale factor to a difference between physical hand location and physical head location 225, and adding an offset representing the virtual head location 270. This can, for example, be expressed mathematically $$\text{VirtualHandLocation} = \text{VirtualHeadLocation} + (\text{PhysicalHandLocation} - \text{PhysicalHeadLocation}) * \text{ScaleFactor},$$

where VirtualHandLocation is the location 255 of the virtual hand 260 (i.e., virtual hand location 255), VirtualHeadLocation is the virtual head location 270, PhysicalHandLocation is the location 235 of the physical hand 240 (i.e., physical hand location 235), PhysicalHeadLocation is the physical head location 225, and ScaleFactor represents a ratio of the sizes of the unreachable portion 250 and the reachable portion 245. Other mappings, relationships and translations may be used. This mapping may be performed in two-dimensions (2D) and three-dimensions (3D).

Consider an example where the boundaries 252 and 254 are spheres, and the physical head location 225 and the virtual head location 270 coincide. If the physical hand location 235 is at the boundary 252, then the difference above is approximately the radius 252A of the reachable portion 245. The ScaleFactor would be the radius 254A divided by the radius 252A. The above expression thus results in the virtual hand location 260 on the boundary 254, centered at the physical head location 225, which is equal to the virtual head location 270.

In some examples, there are two or more unreachable portions that are mapped separately and that can be swapped between. For instance, a user can manipulate a small-scale unreachable portion, and also manipulate a large-scale unreachable portion. Each unreachable portion being better for slightly different adjustments (painting a wall vs. moving a small object). In some examples, there are multiple virtual cursors that exist simultaneously in multiple unreachable portions.

One or more of the elements and interfaces shown in FIGS. 1, 2A and 2B may be combined, divided, re-arranged, omitted, eliminated and/or implemented in any other way. Further, one or more circuit(s), programmable processor(s), fuses, application-specific integrated circuit(s) (ASIC(s)), programmable logic device(s) (PLD(s)), field-programmable logic device(s) (FPLD(s)), and/or field-programmable gate array(s) (FPGA(s)), etc. can be used. Moreover, more interfaces and/or elements may be included instead of, or in addition to, those shown, and/or may include more than one of any or all of the illustrated interfaces and elements. The elements shown may, for example, be implemented as machine-readable instructions carried out by one or more processors. A processor, a controller and/or any other suitable processing device such as processor P02 or processor P52 shown in FIG. 4 may be used, configured and/or programmed to execute and/or carry out the examples disclosed herein including, but not limited to the HMD 110, the controller 112, the device 126-128 and 130, the HMD 215 and the controller 220. For example, the disclosed examples may be embodied in program code and/or machine-readable instructions stored on a tangible and/or non-transitory computer-readable medium accessible by a processor, a computer and/or other machine having a processor, such as that discussed below in connection with FIG. 4. Machine-readable instructions comprise, for example, instructions that cause a processor, a computer and/or a machine having a processor to perform one or more particular processes. Many other methods of implementing the disclosed examples may be employed. For example, the order of execution may be changed, and/or one or more of the blocks and/or interactions described may be changed, eliminated, sub-divided, or combined. Additionally, any or the entire example may be carried out sequentially and/or carried out in parallel by, for example, separate processing threads, processors, devices, discrete logic, circuits, etc.

Figure 3:
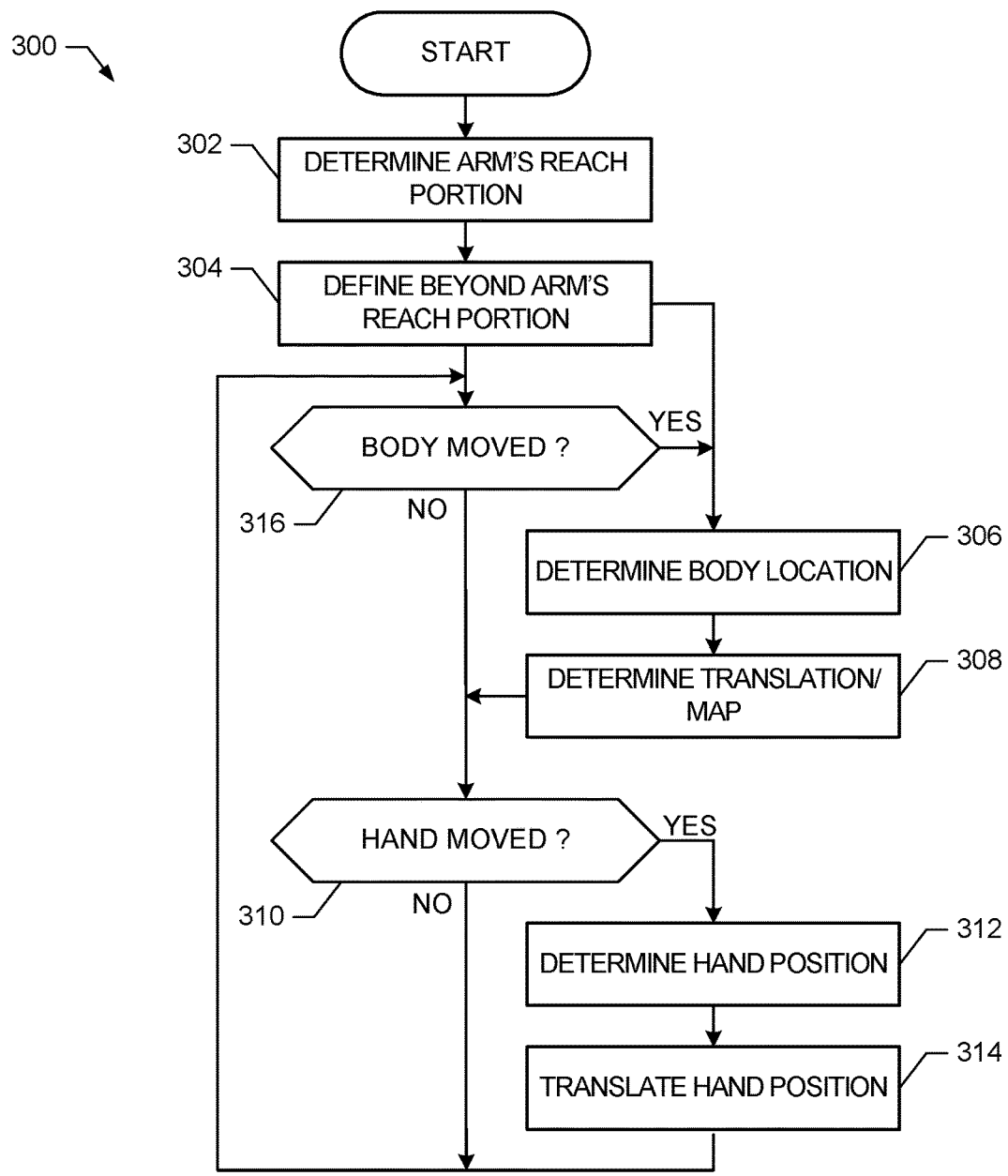
FIG. 3 is a flowchart illustrating an example method that may, for example, be implemented using machine-readable instructions executed by one or more processors to perform the methods and apparatus disclosed herein.

Turning to FIG. 3, an example method 300 that may be performed to enable navigation within a VR environment as disclosed herein is shown. The example method 300 of FIG. 3 begins with determining the reachable portion 245 (block 302), and determining the unreachable portion 250 (block 304). The location 225 of the head 230 of the user 210 is identified (block 306), and the mapping (e.g., translation, transformation, etc.) that maps locations and movement in the reachable portion 245 into the unreachable portion 250 is determined (block 308).

If the hand 240 is moved (or if it is the reachable time at determination block 310) (block 310), the location 235 of the hand 240 in the reachable portion 245 is determined (block 312), and the physical hand location 235 is mapped from the location 235 in the reachable portion 245 into the virtual hand location 255 of the virtual hand 260 in the unreachable portion 250 (block 314). Control returns to block 316.

Returning to block 310, if the hand 240 has not moved (or if it is not the reachable time at this determination block) (block 310), control returns to block 316 to check for body movement.

At block 316, if the physical body 210 in the reachable portion has moved, or the location 270 of the virtual user 265 has changed (block 316), the location 225 of the head 230 of the user 210 is identified (block 306), and the mapping that maps locations and movement from the reachable portion 245 into the unreachable portion 250 is determined (block 308). Otherwise, at block 316, control proceeds to block 310 skipping blocks 306 and 308.

The example method 300 of FIG. 3, or other methods disclosed herein, may, for example, be implemented as machine-readable instructions carried out by one or more processors to control or operate the example display assemblies disclosed herein. A processor, a controller and/or any other suitable processing device may be used, configured and/or programmed to execute and/or carry out the example methods disclosed herein. For instance, the example method 300 of FIG. 3, or other methods disclosed herein may be embodied in program code and/or machine-readable instructions stored on a tangible and/or non-transitory computer-readable medium accessible by a processor, a computer and/or other machine having a processor, such as that discussed below in connection with FIG. 4. Machine-readable instructions comprise, for example, instructions that cause a processor, a computer and/or a machine having a processor to perform one or more particular processes. Many other methods of implementing the example method 300 of FIG. 3, or other methods disclosed herein may be employed. For example, the order of execution may be changed, and/or one or more of the blocks and/or interactions described may be changed, eliminated, sub-divided, or combined. Additionally, any of the entire example method 300 of FIG. 3, or other methods disclosed herein may be carried out sequentially and/or carried out in parallel by, for example, separate processing threads, processors, devices, discrete logic, circuits, etc.

As used herein, the term "computer-readable medium" is expressly defined to include any type of tangible or non-transitory computer-readable medium and to expressly exclude propagating signals. Example computer-readable medium include, but are not limited to, a volatile and/or non-volatile memory, a volatile and/or non-volatile memory device, a compact disc (CD), a digital versatile disc (DVD), a read-only memory (ROM), a random-access memory (RAM), a programmable ROM (PROM), an electronically-programmable ROM (EPROM), an electronically-erasable PROM (EEPROM), an optical storage disk, an optical storage device, a magnetic storage disk, a magnetic storage device, a cache, and/or any other storage media in which information is stored for any duration (e.g., for extended time periods, permanently, brief instances, for temporarily buffering, and/or for caching of the information) and that can be accessed by a processor, a computer and/or other machine having a processor.

Returning to FIG. 1, the example network 140 may be constructed using any number and type(s) of private and/or public networks including, but not limited to, the Internet, a cellular data network, a coaxial cable network, a satellite network, a fiber optic network, a dialup or broadband modem over a telephone network, a Wi-Fi® hotspot, a private communications network (e.g., a private local area network (LAN), a wireless local area network (WLAN), a leased line), etc., and any combination thereof.

The example system 100 of FIG. 1 further includes the VR content system 130. The VR content system 130 may represent a server device. The example VR content system 130 of FIG. 1 includes any number of repositories 132 storing content and/or virtual reality applications 134 that can generate, modify, and execute VR scenes.

The example HMD 110 of FIG. 1 may include, for instance, a VR headset, glasses, an eyepiece, or any other wearable device capable of light-emitting portioning VR content. In operation, the HMD 110 can, for example, execute a VR application 134 to playback, present, receive or process images for a user. However, images maybe played back, presented and light-emitting portioned by the HMD 110 without need for a VR application 134. In some implementations, a VR application 134 of the HMD 110 is hosted by one or more of the devices 126-128 shown in FIG. 1.

The one or more VR applications 134 of FIG. 1 can be configured to execute on any or all of the devices 110 and 126-128. The HMD 110 can be communicatively coupled to one or more of the devices 126-128 to access VR content stored on or accessible via the VR content system 130. The devices 126-128 can be communicatively coupled (wired and/or wirelessly) to the HMD 110.

The example HMD 110 may be wirelessly coupled to the devices 126-128 via any combination of wireless networks and/or protocols such as, but not limited to, any of the Institute of Electrical and Electronics Engineers (IEEE®) 802.11x family of standards, Wi-Fi®, Bluetooth®, etc.

In the event the HMD 110 is electrically coupled to one or more of the devices 126-128, a cable with an appropriate connector on either end for plugging into the devices 126-128 may be used. For example, the cable can include a Universal Serial Bus (USB) connector on both ends. The USB connectors can be the same USB type connector, or the USB connectors can each be a different type of USB connector. The various types of USB connectors include, but are not limited to, USB A-type connectors, USB B-type connectors, micro-USB A connectors, micro-USB B connectors, micro-USB AB connectors, USB five pin Mini-b connectors, USB four pin Mini-b connectors, USB 3.0 A-type connectors, USB 3.0 B-type connectors, USB 3.0 Micro B connectors, and USB C-type connectors.

In some implementations, the mobile device 126 executes the VR application(s) 134 and provides the content for the VR environment. In some implementations, the laptop computing device 127 executes the VR application(s) 134 and provides content from one or more content servers (e.g., the VR content server 130). In some implementations, the desktop computing device 128 executes the VR application(s) 134 and provides content from one or more content servers (e.g., the VR content server 130). The one or more content servers 130 and one or more computer-readable storage devices 132 can communicate with the mobile device 126, the laptop computing device 127, and/or the desktop computing device 128 using the network 140 to provide content for the HMD 110.

Figure 4:
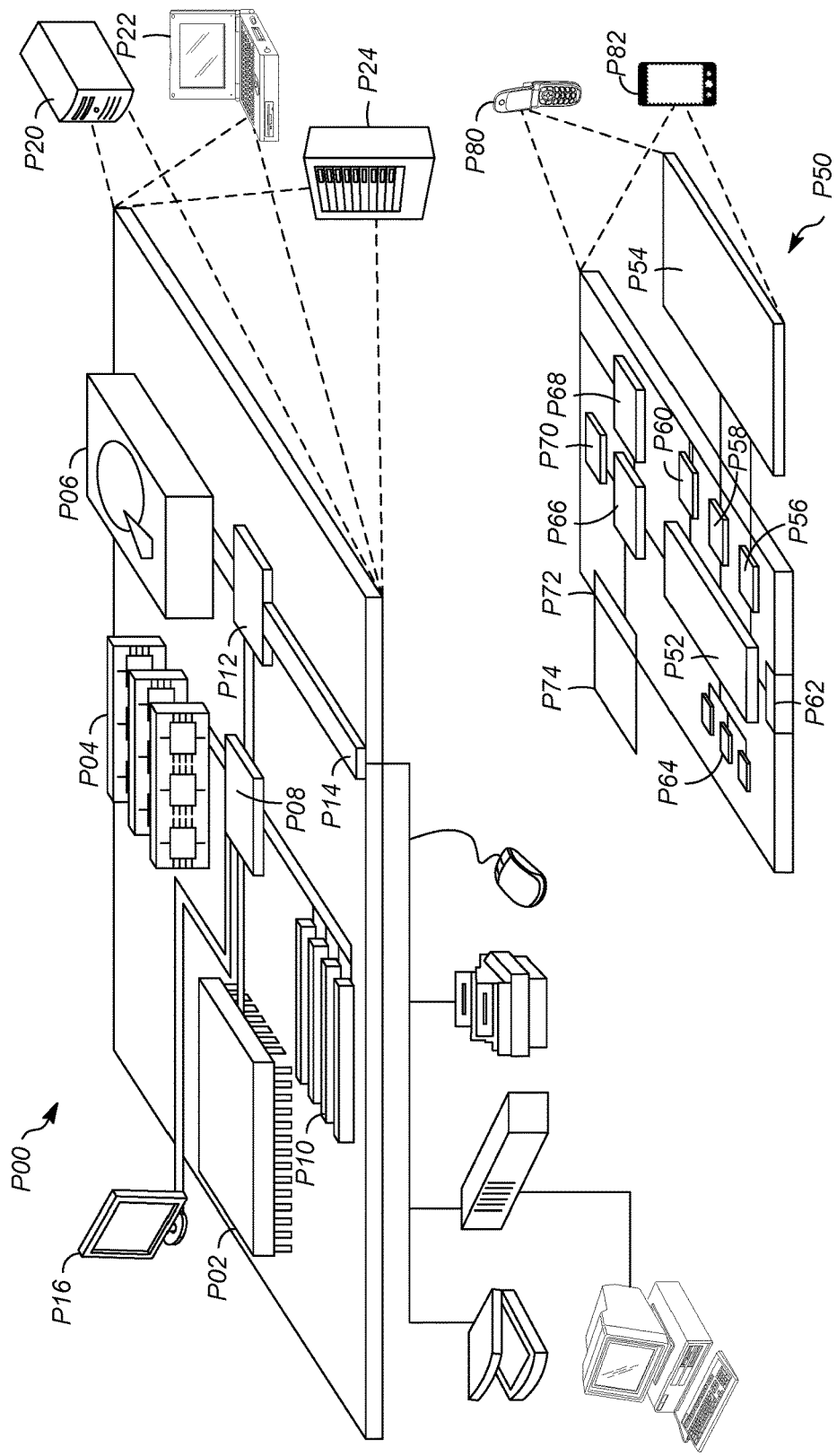
FIG. 4 is a block schematic diagram of an example computer device and an example mobile computer device that may be used to implement the examples disclosed herein.

Turning to FIG. 4, an example of a generic computer device P00 and a generic mobile computer device P50, which may be used with the techniques described here. The computing devices P50 may be used to implement any of the devices disclosed herein including, but not limited to, HMD 110, controller, devices 126-128 and 130, HMD 215 and controller 220. Computing device P00 is intended to represent various forms of digital computers, such as laptops, desktops, tablets, workstations, personal digital assistants, televisions, servers, blade servers, mainframes, and other appropriate computing devices. Computing device P50 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device P00 includes a processor P02, memory P04, a storage device P06, a high-speed interface P08 connecting to memory P04 and high-speed expansion ports P10, and a low speed interface P12 connecting to low speed bus P14 and storage device P06. The processor P02 can be a semiconductor-based processor. The memory P04 can be a semiconductor-based memory. Each of the components P02, P04, P06, P08, P10, and P12, are interconnected using various busses, connections, memories, caches, etc. and may be mounted on a common motherboard or in other manners as appropriate. The processor P02 can process instructions for execution within the computing device P00, including instructions stored in the memory P04 or on the storage device P06 to light-emitting portion graphical information for a GUI on an external input/output device, such as light-emitting portion P16 coupled to high speed interface P08. In other implementations, multiple processors and/or multiple buses may be used, as appropriate, along with multiple memories and types of memory. Also, multiple computing devices P00 may be connected, with each device providing portions of the necessary operations (e.g., as a server bank, a group of blade servers, or a multi-processor system).

The memory P04 stores information within the computing device P00. In one implementation, the memory P04 is a volatile memory unit or units. In another implementation, the memory P04 is a non-volatile memory unit or units. The memory P04 may also be another form of computer-readable medium, such as a magnetic or optical disk.

The storage device P06 is capable of providing mass storage for the computing device P00. In one implementation, the storage device P06 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory P04, the storage device P06, or memory on processor P02.

The high speed controller P08 manages bandwidth-intensive operations for the computing device P00, while the low speed controller P12 manages lower bandwidth-intensive operations. Such allocation of functions is exemplary only. In one implementation, the high-speed controller P08 is coupled to memory P04, light-emitting portion P16 (e.g., through a graphics processor or accelerator), and to high-speed expansion ports P10, which may accept various expansion cards (not shown). In the implementation, low-speed controller P12 is coupled to storage device P06 and low-speed expansion port P14. The low-speed expansion port, which may include various communication ports (e.g., USB, Bluetooth, Ethernet, Wi-Fi) may be coupled to one or more input/output devices, such as a keyboard, a pointing device, a scanner, or a networking device such as a switch or router, e.g., through a network adapter.

The computing device P00 may be implemented in a number of different forms, as shown in the figure. For example, it may be implemented as a standard server P20, or multiple times in a group of such servers. It may also be implemented as part of a rack server system P24. In addition, it may be implemented in a personal computer such as a laptop computer P22. Alternatively, components from computing device P00 may be combined with other components in a mobile device (not shown), such as device P50. Each of such devices may contain one or more of computing device P00, P50, and an entire system may be made up of multiple computing devices P00, P50 communicating with each other.

Computing device P50 includes a processor P52, memory P64, an input/output device such as a light-emitting portion P54, a communication interface P66, and a transceiver P68, among other components. The device P50 may also be provided with a storage device, such as a microdrive or other device, to provide additional storage. Each of the components P50, P52, P64, P54, P66, and P68, are interconnected using various buses, and several of the components may be mounted on a common motherboard or in other manners as appropriate.

The processor P52 can execute instructions within the computing device P50, including instructions stored in the memory P64. The processor may be implemented as a chipset of chips that include separate and multiple analog and digital processors. The processor may provide, for example, for coordination of the other components of the device P50, such as control of user interfaces, applications run by device P50, and wireless communication by device P50.

Processor P52 may communicate with a user through control interface P58 and light-emitting portion interface P56 coupled to a light-emitting portion P54. The light-emitting portion P54 may be, for example, a TFT LCD (Thin-Film-Transistor Liquid Crystal Light-emitting portion) or an OLED (Organic Light-emitting Diode) light-emitting portion, or other appropriate light-emitting portion technology. The light-emitting portion interface P56 may comprise appropriate circuitry for driving the light-emitting portion P54 to present graphical and other information to a user. The control interface P58 may receive commands from a user and convert them for submission to the processor P52. In addition, an external interface P62 may be provided in communication with processor P52, so as to enable near area communication of device P50 with other devices. External interface P62 may provide, for example, for wired communication in some implementations, or for wireless communication in other implementations, and multiple interfaces may also be used.

The memory P64 stores information within the computing device P50. The memory P64 can be implemented as one or more of a computer-readable medium or media, a volatile memory unit or units, or a non-volatile memory unit or units. Expansion memory P74 may also be provided and connected to device P50 through expansion interface P72, which may include, for example, a SIMM (Single Inline Memory Module) card interface. Such expansion memory P74 may provide extra storage space for device P50, or may also store applications or other information for device P50. Specifically, expansion memory P74 may include instructions to carry out or supplement the processes described above, and may include secure information also. Thus, for example, expansion memory P74 may be provide as a security module for device P50, and may be programmed with instructions that permit secure use of device P50. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer or machine-readable medium, such as the memory P64, expansion memory P74, or memory on processor P5 that may be received, for example, over transceiver P68 or external interface P62.

Device P50 may communicate wirelessly through communication interface P66, which may include digital signal processing circuitry where necessary. Communication interface P66 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver P68. In addition, short-range communication may occur, such as using a Bluetooth, Wi-Fi, or other such transceiver (not shown). In addition, GPS (Global Positioning System) receiver module P70 may provide additional navigation- and location-related wireless data to device P50, which may be used as appropriate by applications running on device P50.

Device P50 may also communicate audibly using audio codec P60, which may receive spoken information from a user and convert it to usable digital information. Audio codec P60 may likewise generate audible sound for a user, such as through a speaker, e.g., in a handset of device P50. Such sound may include sound from voice telephone calls, may include recorded sound (e.g., voice messages, music files, etc.) and may also include sound generated by applications operating on device P50.

The computing device P50 may be implemented in a number of different forms, as shown in the figure. For example, it may be implemented as a cellular telephone P80. It may also be implemented as part of a smart phone P82, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a light-emitting portion device (e.g., a CRT (cathode ray tube) or LCD (liquid crystal light-emitting portion) monitor) for light-emitting portioning information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Additionally, connecting lines and connectors shown in the various figures presented are intended to represent exemplary functional relationships and/or physical or logical couplings between the various elements. It should be noted that many alternative and/or additional functional relationships, physical connections or logical connections may be present. Moreover, no item or component is essential to the practice of this disclosure unless the element is specifically described as "essential" or "critical". Additionally, the figures and/or drawings are not drawn to scale, but rather are drawn for clarity of illustration and description.

Although certain example methods, apparatuses and articles of manufacture have been described herein, the scope of coverage of this patent is not limited thereto. It is to be understood that terminology employed herein is for the purpose of describing particular aspects, and is not intended to be limiting. On the contrary, this patent covers all methods, apparatus and articles of manufacture fairly falling within the scope of the claims of this patent.

What is claimed is:

1. A method comprising:
    defining a reachable portion of a virtual-reality (VR) environment via a virtual reality controller, the reachable portion defined by a boundary that has a first size;
    defining a plurality of unreachable portions via the virtual reality controller, the plurality of unreachable portions being separate from each other;
    selecting at least one of the plurality of the unreachable portions, the selected unreachable portion having a boundary that has a second size, the second size being different than the first size; and translating a physical hand location in the reachable portion into a virtual hand location in the selected unreachable portion by applying a scale factor to a difference between the physical hand location and a physical head location and adding an offset that represents a virtual head location.

2. The method of claim 1, wherein a physical object can be reached in the reachable portion.

3. The method of claim 1, wherein the translating the physical hand location into the virtual hand location comprises:
a reachable translation in a first direction; and
an unreachable translation different from the reachable translation in second direction different from the first direction.

4. The method of claim 1, wherein the translating the physical hand location into the virtual hand location comprises enabling generally all of the selected unreachable portion to be interacted with by physical hand locations in the reachable portion.

5. The method of claim 1, wherein the translating the physical hand location into the virtual hand location comprises a two-dimensional (2D) and/or a three-dimensional (3D) translation.

6. The method of claim 1, wherein defining the reachable portion comprises determining a body location and a range of movement about the body location.

7. The method of claim 6, further comprising, when the body location changes:
re-defining the reachable portion; and
changing the translating the physical hand location into the virtual hand location.

8. The method of claim 6, wherein the range of movement comprises:
a reachable distance in a first direction; and
an unreachable distance in second direction.

9. The method of claim 8, wherein the reachable and unreachable distances change as the body location changes.

10. The method of claim 6, wherein the translating the physical hand location into the virtual hand location comprises applying a scale factor to a difference between the physical hand location and the body location.

11. The apparatus of claim 1, wherein the scale factor is a ratio of the second size of one of the plurality of the unreachable portions and the first size of the reachable portion.

12. The method of claim 11, wherein the second size of the first unreachable portion has a boundary of a first radius and the first size of the reachable portion has a boundary of a second radius.

13. An apparatus comprising:
a reachable sensor to sense a physical hand location and a physical head location; and
a processor programmed to:
define a reachable portion of a virtual-reality (VR) environment via a virtual reality controller, the reachable portion defined by a first boundary that has a first size;
define a plurality of unreachable portions beyond the reachable portion via the virtual reality controller, each of the plurality of unreachable portions being separate from each other and configured to be swapped;
select at least one of the plurality of unreachable portions, the selected unreachable portion having a second boundary that has a second size, the second size being different than the first size; and
translate a movement of the sensed physical hand location in the reachable portion into a movement of a virtual hand location in the selected unreachable portion by applying a scale factor based on the second size of the selected unreachable portion and the first size of the reachable portion when the physical head location and a virtual head location are located at a same position.

14. The apparatus of claim 13, further comprising an unreachable sensor to sense a body location, wherein the processor defines the reachable portion about the body location.

15. The apparatus of claim 13, wherein the translating the sensed physical hand location into the virtual hand location comprises enabling substantially all the selected unreachable portion to be interacted with by physical hand locations in the reachable portion.

16. The apparatus of claim 13, wherein, when the body location changes, the processor re-defines the reachable portion, and changing the translating from the sensed physical hand location in the reachable portion into the virtual hand location in the selected unreachable portion.

17. The apparatus of claim 13, wherein the apparatus comprises a VR head-mounted device or a VR content system.

18. A non-transitory machine-readable media storing machine-readable instructions that, when executed, cause a machine to at least:
define a reachable portion of a virtual environment, via a virtual reality controller, having a first size defined by a reachable distance of a user in a curved shape;
define a first unreachable portion of the virtual environment via the virtual reality controller, the first unreachable portion being outside of the reachable portion and having a second size, the second size being different than the first size;
define a second unreachable portion of the environment via the virtual reality controller, the second unreachable portion being outside of the reachable portion and having a third size, the third size being different than the first size or the second size; and
translate a physical hand location in the reachable portion into a virtual hand location in one of the first unreachable portion or the second unreachable portion by applying a scale factor to a difference between the physical hand location and a physical head location and adding an offset that represents a virtual head location.

19. The non-transitory media of claim 18, wherein the translating the physical hand location into the virtual hand location comprises enabling substantially all of one of the first unreachable portion or the second unreachable portion to be interacted with by physical hand locations in the reachable portion.

20. The non-transitory media of claim 18, wherein the machine-readable instructions, when executed, cause the machine to define the reachable portion by determining a physical body location and/or a range of physical hand movement about the body location.

* * * * *